Patented Jan. 9, 1934

1,942,757

UNITED STATES PATENT OFFICE 1,942,757

RESINOUS COATING COMPOSITION

John W. Iliff, Ridley Park, and Harry R. Young, Philadelphia, Pa., assignors to E. I. du Pont de Nemours & Company, Wilmington, Del., a corporation of Delaware No Drawing. Application August 20, 1930 Serial No. 476,719

3 Claims. (Cl. 134—26)

This invention relates to coating compositions and more particularly to synthetic resin enamel finishes.

Polyhydric alcohol-polybasic acid resins have proven valuable in the manufacture of coating compositions but certain disadvantages have attended their use. For the most part, they have been modified with drying oils and natural gums and dissolved in solvents such as turpentine or mineral spirits. Suitable driers have been added to these solutions and they have been applied as clear finishes or pigmented and used as paints or enamels. Certain of these modified polyhydric alcohol-polybasic acid resins, notably those containing the equivalent of from about 55% to 65% of oil, have very desirable properties. The films possess unusual water resistance and durability, as well as excellent appearance. The use of these and certain other synthetic resins, however, is attended by certain disadvantages in that as ordinarily prepared, these compositions are very difficult to apply, particularly in hot weather. In order to make them thin enough for application, they must contain considerable quantities of volatile solvents. These volatile solvents evaporate rapidly as soon as the film is partly spread, causing skinning over of the surface due to oxidation before sufficient oxidation has taken place in the lower layers of the drying film, and thereby making the material drag under the brush, also making it very difficult to blend one section of the work with the next, causing the job to show "laps" as the painter terms it.

In accordance with the invention set forth in the copending application of J. W. Iliff and Paul Robinson, Serial No. 476,720, filed Aug. 20, 1930, the above noted disadvantages are overcome by substituting for the turpentine or mineral spirits heretofore used as the solvent for the resin, a high boiling solvent having a narrow boiling range, this boiling range lying in the range of temperature between 150° C. and 250° C. It was found, as set forth in the above noted application, that the introduction of a high boiling slowly evaporating solvent into an enamel, in place of the ordinary low boiling rapidly evaporating solvent, markedly improves the application properties of the enamel because of the fact that loss of this volatile solvent is slower, and consequently the viscosity does not increase so rapidly as it would with the lower boiling solvent. Therefore, the initial ease of brush application is maintained longer without excessive drag or pull under the brush. Moreover, the introduction of this high boiling slowly evaporating solvent in place of the low boiling rapidly evaporating solvent used heretofore causes the film to remain liquid for a longer period of time, and as a result oxygen is absorbed quite uniformly throughout the thickness of the film while it is still liquid, and consequently the film dries uniformly without a surface or skin dry. By this means the surface drying incident to the use of synthetic resins, particularly polyhydric alcohol-polybasic acid resins, is overcome, and because of this fact the film is held open, the drying takes place evenly throughout the film, which in turn results in a harder film than is produced from solutions of these resins in the usual volatile solvents.

It will be seen, therefore, that these two objects—that of improving application characteristics due to the rapid loss of the low boiling solvent, and the prevention of surface drying can both be accomplished by the introduction of a high boiling slowly evaporating solvent which, of course, must be a satisfactory solvent for the balance of the vehicle. It has been observed, however, that these high boiling solvents may at times cause serious loss of gloss in the finished film.

This invention has as an object the production of improved coating compositions. A further object is the elimination of surface drying without loss of gloss in films laid down from coating compositions comprising certain resins and high boiling solvents. A still further object is the production of coating compositions having in addition to the desirable characteristics of the coating compositions claimed in the previously mentioned application, the characteristic of yielding films which dry without substantial loss of gloss. Other objects will appear hereinafter.

These objects are accomplished by the following invention in which a small amount of an oxidation inhibitor is introduced into a polyhydric alcohol-polybasic acid resin coating composition having a high boiling hydrocarbon solvent characterized by a narrow boiling range, this boiling range lying in the range of temperature of about 150° C. to about 250° C.

We have discovered that the loss of gloss in the films of the above mentioned coating compositions prepared from certain resins and high boiling solvents is due to the fact that the resins of the type with which this invention is concerned, oxidizes, and as the resin oxidizes it becomes less soluble in the remaining portion of the solvent. If the evaporation is slow, as it is when the high boiling solvents herein disclosed are used, considerable oxidation takes place, and consequently the remaining small fraction of the solvent is incompatible with the oxidized resin. This results in a slight surface kickout of the resin, i. e., a loss of gloss. This is particularly likely to take place under poor evaporation conditions, such as cold weather or lack of thorough air circulation. We have found, however, that this loss of gloss can be prevented by the introduction of the common oxidation inhibitors usually used in drying oil coating compositions, preferably volatile ones such as creosole, guaiacol, eugenol, catechol, para hydroxy diphenyl and ortho hydroxy diphenyl.

The inhibitors prevent the loss of gloss in the dried film by delaying the oxidation of the resin until more complete evaporation of the solvent has taken place. The introduction of just the right amount of these inhibitors does appreciably though not seriously slow down the initial drying time of the film, and because of this fact care must be exercised to introduce just the right amount of inhibitor. In the following examples, we have included the ideal amount of inhibitor for the particular enamels in question. The amount of oxidation inhibitor necessary depends on the strength of inhibitor. Creosole, for example, is more powerful than guaiacol. It is, therefore, difficult to specify the precise amount of inhibitor within broad and narrow limits though we can and have below definitely specified the concentrations of these two inhibitors with specific resins.

The desired concentration of the inhibitor, of course, will vary depending upon the evaporation characteristics and the solubility characteristics of the solvent as well as on the composition and consequent solubility characteristics of the resin used.

Typical compositions of the polyhydric alcohol-polybasic acid resins from which our improved coating compositions are made, are as follows:

| Resin A | Parts by weight |
|---|---|
| Linseed oil | 59.2 |
| Glycerol | 12.8 |
| Phthalic anhydride | 28.0 |
| | 100.0 |

| Resin B | Parts by weight |
|---|---|
| Glycerol | 12.0 |
| Linseed oil | 40.0 |
| Chinawood oil | 20.0 |
| Phthalic anhydride | 28.0 |
| | 100.0 |

| Resin C | Parts by weight |
|---|---|
| Linseed oil | 54.4 |
| Glycerol | 13.8 |
| Phthalic anhydride | 31.8 |
| | 100.0 |

| Resin D | Parts by weight |
|---|---|
| Glycerol | 17.1 |
| Phthalic anhydride | 27.1 |
| Linseed oil acids | 55.8 |
| | 100.0 |

When the drying oil is used in the synthesis of the resin, as in resins A, B and C, instead of the oil acids, as in resin D, the linseed oil and glycerol are heated together until solution takes place, or in other words until the two phases present are converted into a single phase. The glyceride or mixture of mono- and di-glycerides so formed is then heated with phthalic anhydride until resinification occurs. Resin D may be prepared according to the common practice of synthetic resin manufacture.

High boiling solvents useful for the purposes of our invention are as follows:

Petroleum solvent E: Boiling range 200–230° C.
Petroleum solvent F: Boiling range 180–210° C.
Petroleum solvent G: Boiling range 160–190° C.
Solvent H: Boiling range 190–200° C.
Solvent I: Boiling range 190–210° C.

Solvents H and I are synthetic solvents consisting of reduction products of naphthalene.

It will be noted that these solvents have rather a narrow boiling range, which is preferably not greater than 30° C. The importance of the narrow boiling range for the solvents will be apparent from the following considerations: Practically all of the solvents with which the present invention is concerned are mixtures of quite a number of distinct chemical compounds, not all of which possess the same solvent properties for the materials held in solution which are to form the binder for the coating composition. As evaporation takes place, the concentration in the film, of those solvent compounds having the higher boiling points tends to increase. The solvent compounds having the high boiling points usually have the poorer solvent properties. It will be seen that, the wider the boiling range, the greater the amount of high boiling material remaining in the film and hence a longer time is required for complete evaporation. It would, therefore, be desirable to have the solvent boil over as narrow range as possible, but because of the difficulties involved it is not economically practicable to make the range narrower than 30° C. We prefer to use a boiling range between 185° C. and 215° C. The particular cut selected as a solvent between the mentioned limits of 150°–250° C., as exemplified by solvents E to I above, is dependent upon the solvent power for the particular resin and upon whether or not it is necessary to select one of the higher boiling cuts in order to obtain the desired brushing properties at the sacrifice of obtaining a quicker drying time by using one of the lower boiling cuts. In other words, it is desirable to make the proper compromise between ease of brushing and satisfactory drying time.

In certain types of compositions, namely those in which it is desired to obtain a high gloss, we prefer to use in addition to the high boiling solvents small amounts of stronger solvents having low evaporation rates, such as alcohols and esters. It is preferable that the boiling range of the mixed solvents be not greater than 30° C. It is also desirable that the relative rates of evaporation of the solvents be such that the most active solvent is the last to leave the film.

The high boiling point solvent, resin, drier together with any other ingredients that may be used, are mixed and blended according to the usual practice in paint manufacture. The following are examples of our improved coating compositions embodying high boiling point solvents and polyhydric alcohol-polybasic acid resins.

Example 1
*Green enamel*

| | Parts by weight |
|---|---|
| Chrome green | 10.00 |
| China clay | 20.00 |
| Resin A | 35.00 |
| Drier | 3.00 |
| High flash naphtha | 3.00 |
| Petroleum solvent E | 28.95 |
| Creosole | 0.05 |
| | 100.00 |

Example 2
*Green enamel*

| | Parts by weight |
|---|---|
| Chrome green | 10.00 |
| China clay | 20.00 |
| Resin A | 35.00 |
| Drier | 3.00 |
| 4% ammonium stearate solution | 2.00 |
| High flash naphtha | 3.00 |
| Petroleum solvent E | 26.90 |
| Guiacol | 0.10 |
| | 100.00 |

Example 3
*Gray enamel*

| | Parts by weight |
|---|---|
| 35% leaded zinc oxide | 43.00 |
| Magnesium silicate | 4.00 |
| Resin A | 23.00 |
| Drier | 2.00 |
| High flash naphtha | 2.00 |
| Petroleum solvent E | 21.96 |
| 4% ammonium stearate soln | 2.00 |
| Lamp black | 1.00 |
| French ochre | 2.00 |
| Creosole | 0.04 |
| | 100.00 |

Example 4
*White enamel*

| | Parts by weight |
|---|---|
| Barium base titanium pigment | 19.00 |
| Zinc oxide | 12.00 |
| Lithopone | 19.00 |
| Resin A | 29.00 |
| Petroleum solvent E | 17.95 |
| High flash naphtha | 1.00 |
| Drier | 2.00 |
| Creosole | 0.05 |
| | 100.00 |

Example 5
*Green enamel*

| | Parts by weight |
|---|---|
| Chrome green | 10.00 |
| China clay | 20.00 |
| Resin A | 35.00 |
| Drier | 3.00 |
| High flash naphtha | 3.00 |
| Petroleum solvent F | 28.97 |
| Creosole | 0.03 |
| | 100.00 |

Example 6

| | Parts by weight |
|---|---|
| Chrome green | 10.00 |
| China clay | 20.00 |
| Resin A | 35.00 |
| Drier | 3.00 |
| High flash naphtha | 3.00 |
| Petroleum solvent F | 28.95 |
| Guiacol | 0.05 |
| | 100.00 |

Example 7

| | Parts by weight |
|---|---|
| Chrome green | 10.00 |
| China clay | 20.00 |
| Resin A | 35.00 |
| Drier | 3.00 |
| High flash naphtha | 5.00 |
| Petroleum solvent F | 26.98 |
| Creosole | 0.02 |
| | 100.00 |

Example 8

| | Parts by weight |
|---|---|
| Chrome green | 10.00 |
| China clay | 20.00 |
| Resin B | 35.00 |
| Drier | 3.00 |
| High flash naphtha | 3.00 |
| Petroleum solvent E | 28.90 |
| Creosole | 0.10 |
| | 100.00 |

Example 9

| | Parts by weight |
|---|---|
| Chrome green | 10.00 |
| China clay | 17.00 |
| Resin C | 35.000 |
| Drier | 3.00 |
| High flash naphtha | 5.00 |
| Petroleum solvent E | 29.90 |
| Creosole | 0.10 |
| | 100.00 |

Example 9—A

| | Parts by weight |
|---|---|
| Chrome green | 10.00 |
| China clay | 17.00 |
| Resin A | 35.00 |
| Drier | 3.00 |
| High flash naphtha | 5.00 |
| Petroleum solvent G | 29.95 |
| Creosole | 0.05 |
| | 100.00 |

Example 10

| | Parts by weight |
|---|---|
| Chrome green | 10.00 |
| China clay | 20.00 |
| Resin D | 35.00 |
| Drier | 3.00 |
| High flash naphtha | 3.00 |
| Petroleum solvent E | 28.95 |
| Cresole | 0.05 |
| | 100.00 |

Example 11

| | Parts by weight |
|---|---|
| Chrome green | 10.00 |
| China clay | 17.00 |
| Resin A | 35.00 |
| Drier | 3.00 |
| High flash naphtha | 5.00 |
| Petroleum solvent E | 29.98 |
| Catechol | 0.02 |
| | 100.00 |

Example 12

| | Parts by weight |
|---|---|
| Chrome green | 10.00 |
| China clay | 17.00 |
| Resin A | 35.00 |
| Drier | 3.00 |
| High flash naphtha | 5.00 |
| Petroleum solvent E | 29.95 |
| Eugenol | 0.05 |
| | 100.00 |

Example 13

| | Parts by weight |
|---|---|
| Chrome green | 10.00 |
| China clay | 17.00 |
| Resin A | 35.00 |
| Drier | 3.00 |
| High flash naphtha | 5.00 |
| Petroleum solvent E | 29.98 |
| Para hydroxy di phenyl | 0.02 |
| | 100.00 |

Example 14

| | Parts by weight |
|---|---|
| Chrome green | 10.00 |
| China clay | 17.00 |
| Resin A | 35.00 |
| Drier | 3.00 |
| High flash naphtha | 5.00 |
| Petroleum solvent E | 29.98 |
| Ortho hydroxy di phenyl | 0.02 |
| | 100.00 |

Example 15

| | Parts by weight |
|---|---|
| Chrome green | 10.00 |
| China clay | 17.00 |
| Resin A | 35.00 |
| Drier | 3.00 |
| Solvent H | 5.00 |
| Petroleum solvent E | 29.98 |
| Ortho hydroxy di phenyl | 0.02 |
| | 100.00 |

Although the above examples illustrate in general the scope of the invention, it should nevertheless be understood that other oxidation inhibitors and other resins may be used and other high boiling solvents may be substituted for the high boiling solvents covered in these examples.

The amount of inhibitor which can be satisfactorily used will, of course, vary with the strength of the inhibitor, the solvent power of the high boiling hydrocarbon and the solubility of the oxidized or oxidizing resin. For example, with resin A, creosole may be used within the range of .02 to .1% on the finished enamel. Approximately twice as much guaiacol is required and approximately twice as much may be used to obtain the desired effect without unduly prolonging the dry. In other words, with guaiacol the preferred amount should be 0.1% and the range would be from 0.2 to .04%. In Example 8 and Example 9, we have resins that are less soluble and which dry somewhat more rapidly and, therefore, the amount of creosole and guaiacol should be double as shown in the above figures.

The present invention is of peculiar importance in connection with the polyhydric alcohol-polybasic acid resins. This is because these resins become quite insoluble when oxidized to the extent that takes place during the long drying period of the high boiling point solvent. On the other hand, most other resins, notably those of the natural variety are, even in their partially oxidized form, more soluble than the polyhydric alcohol-polybasic acid resins. These other resins which are still soluble when oxidized do not separate in such a way as to yield a non-homogeneous film, even though some of the solvent remains unevaporated. There would, of course, be no purpose in applying the present invention to those natural or synthetic resins which are in their oxidized state, still soluble in their menstruum. It should be noted also, that most natural resins do not present the problem of skin drying, when used with the usual volatile solvents, and hence there is also no purpose in using such resins with the high boiling solvents. It will be apparent, therefore, that the present invention requires the following three ingredients for its attainment: a high boiling solvent; a resin insoluble, when oxidized, in the solvent, and an oxidation inhibitor for the resin. It is to be understood that the term insoluble as used herein refers to that condition of the resin which results in the previously mentioned surface kickout or loss of gloss in the dried film.

We are aware that it is not new to incorporate oxidation inhibitors in coating compositions. These oxidation inhibitors have, however, been chiefly used in order to prevent material from skinning on storage in the cans or in the case of compositions intended for dip application, to prevent skinning in the tanks. The fact that an oxidation inhibitor will prevent the change of a resin from the soluble to the insoluble form until after a high boiling and slowly evaporating solvent has had time to leave the film has, insofar as we are aware, not heretofore been recognized.

By means of the present invention a film having a glossy surface is obtained in addition to the other advantages obtained from films comprised of oxidizable resins and high boiling point solvents, as for instance, the hard film produced because of the uniform drying which takes place in the absence of surface drying; a result which takes place because of the use of the high boiling solvents in lieu of the usual volatile solvents in these synthetic resin coating compositions.

As many apparently widely different embodiments of this invention may be made without departing from the spirit and scope thereof, it is to be understood that we do not limit ourselves to the specific embodiments thereof except as defined in the appended claims.

We claim:

1. A coating composition comprising a petroleum hydrocarbon solvent having a boiling range not greater than about 30° C. which lies within the range of temperature of about 150° C. to about 250° C., an oxidizable polyhydric alcohol-polybasic acid resin insoluble when oxidized in the solvent, and an oxidation inhibitor for the resin.

2. A coating composition comprising a petroleum hydrocarbon solvent having a boiling range not greater than about 30° C. which lies within the range of temperature of about 150° C. to about 250° C., polyhydric alcohol-polybasic acid-unsaturated fatty acid resin, and an oxidation inhibitor for the resin.

3. A coating composition comprising a high boiling petroleum hydrocarbon solvent, and a small amount of more active solvent, the mixed solvents having a boiling range not greater than about 30° C. which lies within the range of temperature of 150° C. to 250° C., polyhydric alcohol-polybasic acid-unsaturated fatty acid resin, and an oxidation inhibitor for the resin.

JOHN W. ILIFF.
HARRY R. YOUNG.